US011210323B2

(12) United States Patent
Vandenbrouck et al.

(10) Patent No.: US 11,210,323 B2
(45) Date of Patent: Dec. 28, 2021

(54) METHODS AND SYSTEMS FOR GENERATING PROPERTY KEYS CORRESPONDING TO PHYSICAL SPACES, DEVICES, AND/OR USERS

(71) Applicant: MICROSOFT TECHNOLOGY LICENSING, LLC, Redmond, WA (US)

(72) Inventors: Gregory Christopher John Vandenbrouck, Bellevue, WA (US); Kyle Kraeger Getty, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 307 days.

(21) Appl. No.: 15/964,626

(22) Filed: Apr. 27, 2018

(65) Prior Publication Data

US 2019/0332693 A1    Oct. 31, 2019

(51) Int. Cl.
  *G06F 16/29* (2019.01)
  *G06F 16/28* (2019.01)

(52) U.S. Cl.
  CPC ............ *G06F 16/29* (2019.01); *G06F 16/288* (2019.01)

(58) Field of Classification Search
  CPC .............................. G06F 16/29; G06F 16/288
  See application file for complete search history.

(56) References Cited

U.S. PATENT DOCUMENTS

| | | | |
|---|---|---|---|
| 5,394,035 A | 2/1995 | Elwell | |
| 5,877,766 A | 3/1999 | Bates et al. | |
| 6,298,425 B1 | 10/2001 | Whitaker et al. | |
| 6,732,124 B1 | 5/2004 | Koseki et al. | |
| 7,617,358 B1 | 11/2009 | Liikanen et al. | |
| 7,620,772 B1 | 11/2009 | Liikanen et al. | |
| 7,653,847 B1 | 1/2010 | Liikanen et al. | |

(Continued)

FOREIGN PATENT DOCUMENTS

| | | |
|---|---|---|
| EP | 3570513 A1 | 11/2019 |
| WO | 2015160346 A1 | 10/2015 |
| WO | 2016054629 A1 | 4/2016 |

OTHER PUBLICATIONS

"INT (x86 instruction)", https://en.wikipedia.org/w/index.php?title=INT_(x86_instruction)&oldid=809423342, Nov. 9, 2017, 2 Pages.

(Continued)

*Primary Examiner* — Alford W Kindred
*Assistant Examiner* — Lin Lin M Htay
(74) *Attorney, Agent, or Firm* — Workman Nydegger

(57) ABSTRACT

Generating property keys associated with nodes of a hierarchical graph that defines a topology of a physical space and that is configured to provide user data and sensor data from devices within a physical space. A first property key associated with a first node of the plurality of nodes within the hierarchical graph is received and stored in a property store in association with a first path of the first node. In response to receiving a request associated with determining each property key available to a second node that is a child node of the first node, the first property key is identified as being available to the second node by virtue of the second node being a child node of the first node. The first property key is updated in the property store to also be associated with the second path of the second node.

20 Claims, 9 Drawing Sheets

(56) References Cited

U.S. PATENT DOCUMENTS

| | | |
|---|---|---|
| 7,685,360 B1 | 3/2010 | Brunnett et al. |
| 7,752,491 B1 | 7/2010 | Liikanen et al. |
| 7,777,632 B2 | 8/2010 | Elwell |
| 7,916,421 B1 | 3/2011 | Liikanen et al. |
| 8,732,039 B1 | 5/2014 | Chen et al. |
| 8,743,198 B2 | 6/2014 | Padmanabh et al. |
| 8,797,159 B2 | 8/2014 | Kirkpatrick et al. |
| 9,020,987 B1 | 4/2015 | Nanda et al. |
| 9,361,306 B1 | 6/2016 | Pawar et al. |
| 9,542,396 B1 | 1/2017 | Pawar et al. |
| 9,551,594 B1 | 1/2017 | Stamatakis |
| 9,632,877 B1 | 4/2017 | Yin et al. |
| 9,766,079 B1 | 9/2017 | Poel et al. |
| 9,818,448 B1 | 11/2017 | Sexton et al. |
| 9,852,388 B1 | 12/2017 | Swieter et al. |
| 9,853,827 B1 | 12/2017 | Goodnow et al. |
| 9,875,333 B1 | 1/2018 | Verma et al. |
| 9,921,726 B1 | 3/2018 | Sculley et al. |
| 9,955,318 B1 | 4/2018 | Scheper et al. |
| 10,181,139 B2 | 1/2019 | Glass et al. |
| 10,430,293 B1 | 10/2019 | Skowronski et al. |
| 10,437,791 B1 | 10/2019 | Bebchuk et al. |
| 10,691,354 B1 | 6/2020 | Kucherov |
| 10,705,918 B1 | 7/2020 | Hu et al. |
| 10,893,110 B2 | 1/2021 | Ji |
| 2002/0071392 A1 | 6/2002 | Grover et al. |
| 2002/0199017 A1 | 12/2002 | Russell |
| 2004/0003341 A1 | 1/2004 | Alsafadi et al. |
| 2004/0024724 A1 | 2/2004 | Rubin |
| 2004/0054726 A1 | 3/2004 | Doss et al. |
| 2004/0148397 A1* | 7/2004 | Aronoff ............. G06F 11/2025 709/227 |
| 2004/0153334 A1 | 8/2004 | Dione |
| 2004/0193635 A1 | 9/2004 | Hsu et al. |
| 2004/0231002 A1 | 11/2004 | Jansen |
| 2004/0267694 A1 | 12/2004 | Sakai et al. |
| 2005/0154494 A1 | 7/2005 | Ahmed |
| 2006/0015376 A1 | 1/2006 | Sattler et al. |
| 2006/0202834 A1 | 9/2006 | Moriwaki |
| 2006/0248506 A1 | 11/2006 | Luo et al. |
| 2007/0043747 A1 | 2/2007 | Benton et al. |
| 2007/0100872 A1 | 5/2007 | Bodin et al. |
| 2007/0162315 A1 | 7/2007 | Hodges |
| 2007/0168347 A1 | 7/2007 | Childress et al. |
| 2007/0179934 A1 | 8/2007 | Basov et al. |
| 2007/0198708 A1 | 8/2007 | Moriwaki et al. |
| 2007/0282661 A1 | 12/2007 | Franco |
| 2007/0288291 A1 | 12/2007 | Earle |
| 2008/0046445 A1 | 2/2008 | Passey et al. |
| 2008/0183483 A1 | 7/2008 | Hart |
| 2008/0277486 A1 | 11/2008 | Seem et al. |
| 2009/0006143 A1 | 1/2009 | Orttung et al. |
| 2009/0077044 A1 | 3/2009 | Krishnaswamy et al. |
| 2009/0177484 A1* | 7/2009 | Davis ................. G06F 16/285 705/346 |
| 2010/0070618 A1 | 3/2010 | Kim et al. |
| 2010/0134655 A1 | 6/2010 | Kuroiwa |
| 2010/0144383 A1 | 6/2010 | Berger et al. |
| 2010/0228387 A1 | 9/2010 | Bowers et al. |
| 2010/0250551 A1 | 9/2010 | Kamimura et al. |
| 2010/0269158 A1 | 10/2010 | Ehler et al. |
| 2010/0299517 A1 | 11/2010 | Jukic et al. |
| 2010/0318558 A1 | 12/2010 | Boothroyd |
| 2012/0066197 A1 | 3/2012 | Rana et al. |
| 2013/0223279 A1 | 8/2013 | Tinnakornsrisuphap et al. |
| 2014/0112126 A1 | 4/2014 | Claessens et al. |
| 2014/0122428 A1 | 5/2014 | Zhou et al. |
| 2014/0136377 A1 | 5/2014 | Taylor |
| 2014/0219133 A1* | 8/2014 | Dasgupta ............. H04L 47/28 370/254 |
| 2014/0297206 A1 | 10/2014 | Silverman |
| 2014/0309914 A1 | 10/2014 | Scofield et al. |
| 2014/0310476 A1 | 10/2014 | Kruus et al. |
| 2014/0351181 A1 | 11/2014 | Canoy et al. |
| 2014/0366105 A1 | 12/2014 | Bradley et al. |
| 2015/0032777 A1 | 1/2015 | Dietrich et al. |
| 2015/0067892 A1 | 3/2015 | Zuo et al. |
| 2015/0193739 A1 | 7/2015 | Min et al. |
| 2015/0205582 A1* | 7/2015 | Iskander ................ G06F 8/70 717/105 |
| 2015/0278335 A1* | 10/2015 | Opitz ................... G06F 16/283 707/602 |
| 2016/0012556 A1 | 1/2016 | Moore et al. |
| 2016/0071219 A1 | 3/2016 | Joshi et al. |
| 2016/0072676 A1* | 3/2016 | Gomadam .......... H04L 41/0843 709/221 |
| 2016/0072891 A1 | 3/2016 | Joshi et al. |
| 2016/0135241 A1 | 5/2016 | Gujral et al. |
| 2016/0147962 A1 | 5/2016 | Vollmar et al. |
| 2016/0285717 A1 | 9/2016 | Kim et al. |
| 2016/0291942 A1 | 10/2016 | Hutchison |
| 2016/0292351 A1 | 10/2016 | Jacques et al. |
| 2016/0314542 A1 | 10/2016 | Vollmar et al. |
| 2016/0357524 A1 | 12/2016 | Maluf et al. |
| 2016/0366224 A1 | 12/2016 | Bonagiri et al. |
| 2017/0026806 A1 | 1/2017 | Jampani et al. |
| 2017/0083386 A1 | 3/2017 | Wng et al. |
| 2017/0132545 A1 | 5/2017 | Michaely et al. |
| 2017/0168472 A1 | 6/2017 | Ando et al. |
| 2017/0171313 A1 | 6/2017 | Britt et al. |
| 2017/0247264 A1 | 8/2017 | Eddy |
| 2017/0285081 A1 | 10/2017 | Silverman |
| 2017/0337226 A1 | 11/2017 | Bliss et al. |
| 2017/0351723 A1 | 12/2017 | Vachher et al. |
| 2018/0039399 A1 | 2/2018 | Kaltegaertner et al. |
| 2018/0060256 A1 | 3/2018 | Walker et al. |
| 2018/0074852 A1 | 3/2018 | Bishop et al. |
| 2018/0096589 A1 | 4/2018 | Lynch et al. |
| 2018/0116004 A1 | 4/2018 | Britt et al. |
| 2018/0189316 A1 | 7/2018 | Mazukabzov et al. |
| 2018/0208448 A1 | 7/2018 | Zimmerman et al. |
| 2018/0268029 A1 | 9/2018 | Clemson |
| 2019/0045119 A1 | 2/2019 | Stokking et al. |
| 2019/0095286 A1 | 3/2019 | Fang et al. |
| 2019/0095517 A1 | 3/2019 | Park et al. |
| 2019/0130367 A1 | 5/2019 | Pell et al. |
| 2019/0182369 A1 | 6/2019 | Gauvin et al. |
| 2019/0289648 A1 | 9/2019 | Kim et al. |
| 2019/0339871 A1 | 11/2019 | Kucherov et al. |
| 2019/0339872 A1 | 11/2019 | Kucherov et al. |
| 2019/0347606 A1 | 11/2019 | Malecha et al. |
| 2019/0354906 A1 | 11/2019 | Stanciu et al. |
| 2019/0354910 A1 | 11/2019 | Escapa et al. |
| 2019/0356538 A1 | 11/2019 | Stanciu et al. |
| 2019/0356548 A1 | 11/2019 | Fischer et al. |
| 2019/0356550 A1 | 11/2019 | Stanciu et al. |
| 2020/0042639 A1 | 2/2020 | Mathison et al. |

OTHER PUBLICATIONS

"International Search Report and Written Opinion Issued in PCT Patent Application No. PCT/US2019/030779", dated Jul. 10, 2019, 12 Pages. (MS# 404374-WO-PCT).

"International Search Report & Written Opinion Issued in PCT Application No. PCT/US2019/030797", dated Jul. 8, 2019, 13 Pages. (MS# 404375-WO-PCT).

"Non Final Office Action Issued in U.S. Appl. No. 15/985,228", dated May 12, 2020, 20 Pages. (MS# 404377-US-NP).

"Final Office Action Issued in U.S. Appl. No. 15/985,513", dated Jun. 5, 2020, 25 Pages. (MS# 404375-US-NP).

"Final Office Action Issued in U.S. Appl. No. 15/981,695", dated Nov. 8, 2019, 16 Pages. (MS# 404374-US-NP).

"Non Final Office Action Issued in U.S. Appl. No. 15/981,695", dated May 30, 2019, 19 Pages. (MS# 404374-US-NP).

"Non Final Office Action Issued in U.S. Appl. No. 15/985,487", dated Mar. 25, 2020, 39 Pages. (MS# 404373-US-NP).

"Notice of Allowance Issued in U.S. Appl. No. 15/981,695", dated Jan. 28, 2020, 9 Pages. (MS# 404374-US-NP).

"Non Final Office Action Issued in U.S. Appl. No. 15/985,513", dated Mar. 18, 2020, 28 Pages. (MS# 404375-US-NP).

(56) References Cited

OTHER PUBLICATIONS

"International Search Report and Written Opinion Issued in PCT Application No. PCT/US19/030798", dated Jul. 26, 2019, 12 Pages. (MS# 404377-WO-PCT).
"International Search Report and Written Opinion Issued in PCT Application No. PCT/US19/030796", dated Jul. 26, 2019, 10 Pages. (MS# 404373-WO-PCT).
"Tag (Metadata)", Retrieved From: https://web.archive.org/web/20180128020737/https://en.wikipedia.org/wiki/TAG, Apr. 17, 2018, 10 Pages.
"Final Office Action Issued in U.S. Appl. No. 15/985,487", dated Aug. 26, 2020, 59 Pages. (MS# 404373-US-NP).
"Final Office Action Issued in U.S. Appl. No. 15/985,228", dated Oct. 6, 2020, 21 Pages. (MS# 404377-US-NP).
"Non-Final Office Action Issued in U.S. Appl. No. 15/985,513", dated Apr. 19, 2021, 29 Pages. (MS# 404375-US-NP).
"Non-Final Office Action Issued in U.S. Appl. No. 15/985,228", dated Feb. 26, 2021, 26 Pages. (MS# 404377-US-NP).
"Final Office Action Issued In U.S. Appl. No. 15/985,513", dated Aug. 19, 2021, 43 Pages.
Zhan, et al., "The Full Path to Full-Path Indexing", In Proceedings of the 16th USENIX Conference on File and Storage Technologies, Feb. 12, 2018, pp. 123-138.
"Non Final Office Action Issued in U.S. Appl. No. 15/985,228", dated Sep. 7, 2021, 12 Pages.

* cited by examiner

900

910
Modifying A Hierarchical Graph That Defines A Topology Of A Physical Space And Comprises A Plurality Of Nodes

920
Generating One Or More Properties Keys Associated With A First Node Of The Plurality Of Nodes Within The Hierarchical Graph

930
Receiving A Request Associated With Determining Each Property Key Available To A Second Node Of The Plurality Of Nodes Within The Hierarchical Graph, Wherein The Second Node Is A Child Node Of The First Node

940
In Response To The Received Request, Identifying That Each Of The One Or More Generated Property Keys Are Available To The Second Node

950
Receiving Data Indicative Of Generating A New Property Key Associated With The Second Node

960
Based Receiving The Data Indicative Of Generating The New Property Key, Generating The New Property Key And Associating The New Property Key With The Second Node, Wherein The New Property Key Is Available To Each Child Node Of The Second Node

*FIG. 9*

METHODS AND SYSTEMS FOR GENERATING PROPERTY KEYS CORRESPONDING TO PHYSICAL SPACES, DEVICES, AND/OR USERS

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data.

As computing systems have become cheaper and smaller, they have begun to proliferate to almost all areas of life. For example, Internet of Things (IoT) devices are network-connected devices that are placed in many physical spaces to enable people to interact with and gather information about their environment. For example, offices or homes may include numerous IoT devices that can be used to control locks, to manage indoor climate and receive climate information, to manage lighting and receive lighting information, to open and close doors, to perform cleaning functions, to control audio and/or video equipment, to provide voice interaction, to provide security and monitoring capabilities, etc. As such, IoT devices can process and generate vast amounts of information. Notably, IoT devices are not limited to use in structures such as offices or homes. For example, IoT devices may be used to track any manner of physical items (including, for example, animals such as livestock or pets), to monitor health of people or animals, and so forth.

As IoT devices proliferate, it is becoming increasingly difficult to manage the devices and their users, and to process the data they generate. Notably, it may often be difficult to intuitively manage and group such devices (e.g., based on physical space or synergistic functionality), to efficiently control these devices (including controlling user access), and/or to efficiently access data associated with these devices. For example, managing IoT devices could involve storing large amounts of data associated with the physical environment in which they exist (e.g., buildings with their floors, rooms, room types, objects the rooms, etc.). Similarly, large numbers of devices may also result in enormous amounts of generated data (e.g., sensor data) that may be difficult to manage and access, and to link to the physical environment. Additionally, devices may be placed in vastly different physical environments, such that flexibility in managing devices within different types of physical environments may often be difficult.

BRIEF SUMMARY

At least some embodiments described herein relate to methods, systems, and computer program products for managing physical spaces, associated devices, and users, including providing access to sensor data from devices within a physical space. The embodiments are built on the observation by the inventors that IoT-related data generally includes first data that is relatively static (e.g., data relating to the physical environment in which the IoT devices exist), and data that is more dynamic (e.g., sensor data generated by the IoT devices, themselves).

In view of this recognition, the inventors have invented a multi-database environment for storing such data. In particular, the multi-database environment can include one or more first data structures (e.g., one or more graphs) that store relatively static information in the form of a topology of the physical environment in which the IoT devices exist, including storing references to the devices themselves and users associated with spaces in the physical environment and/or with devices. The first data structure(s) are configured to facilitate queries that can quickly identify physical spaces, users and/or the IoT device(s) within physical spaces—regardless of the size of the topology; quick queries could mean a tradeoff that operations updating the first data structure(s) is comparatively expensive. Additionally, the first data structure(s) are configured to be easily modified with properties, attributes, and so forth associated with nodes of the first data structure. Such modification may allow for flexibility in managing devices located within a host of different types of physical environments. The multi-database environment can also include one or more second data structures that store relatively dynamic information, such as sensor data generated by the IoT devices. The second data structure(s) are configured to efficiently store constantly changing data, and to provide quick access to data generated by an IoT device once that device has been identified using the first data structure(s).

For example, methods, systems, and computer program products may include embodiments that modify a hierarchical graph defining a topology of a physical space and comprising a plurality of nodes. The plurality of nodes of the hierarchical graph may comprise a top node for the physical space and a plurality of other nodes coupled, through zero or more intermediate nodes, to the top node of the physical space. One or more of the plurality of nodes may comprise a device node that represents a device located within the physical space. Each device may be configured to provide data or receive control signals.

Modifying the hierarchical graph may include generating one or more properties keys associated with a first node of the plurality of nodes within the hierarchical graph and receiving a request associated with determining each property key available to a second node of the plurality of nodes within the hierarchical graph. The second node may be a child node of the first node. Modifying the hierarchical graph may also include, in response to the received request, identifying that each of the one or more generated property keys are available to the second node.

Modifying the hierarchical graph may further include receiving data indicative of generating a new property key associated with the second node. Modifying the hierarchical graph may further include, based receiving the data indicative of generating the new property key, generating the new property key and associating the new property key with the second node. The new property key may then be available to each child node of the second node.

Accordingly, the principles described herein may allow for logically organizing devices (e.g., Internet of Things (IoT) devices) within physical spaces (or areas/sub-areas of physical spaces), and associating users with devices and/or spaces, thus allowing for intuitive organization, and control of a plurality of devices, efficient use of such devices, and granular control of user access rights to devices and/or spaces. For instance, each device associated with a particular area/sub-area (e.g., on a particular floor of a building or a particular room) may be easily shut off or placed in a reduced power state, as location-based groupings of devices are automatically created. In particular, relatively static physical space data (e.g., data regarding floors and rooms of a building) and user access data may be placed in a reliable graph (e.g., a relational database), while more dynamic sensor data may be managed in a more dynamic database (e.g., a key-value database).

Additionally, the reliability of hierarchical graph may be supplemented with quickness/efficiency by computing and storing paths associated with each node upfront. Computing and storing the paths may then allow for performing queries with respect to ancestral nodes or child nodes of any given node in an O(1) operation. The hierarchical graph and the dynamic database may then be linked such that sensor data stored at the dynamic database may be quickly accessed when querying nodes associated with an area/sub-area within the hierarchical graph.

Furthermore, a hierarchical graph that corresponds to physical spaces and allows for intuitive organization, access, and control of devices within the physical spaces may also provide flexibility that allows for utilization of the hierarchical graph in essentially any environment. For instance, a hierarchical graph (or portion of a hierarchical graph) may be modified to include any number of property keys associated with any number of nodes within the graph. In particular, property keys may be generated for particular types of nodes (e.g., area nodes, device nodes, sensor nodes, and so forth) and may also be inheritable by child nodes of a node for which a given property key is generated. Additionally, while property keys are extensible, only individuals having certain roles, permissions, and so forth may be able to generate new property keys, thus avoiding any confusion related to confusingly similar property keys.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 9 illustrates a flowchart of a method for generating property keys associated with nodes of a hierarchical graph that is configured to provide access to sensor data from devices within a physical space.

DETAILED DESCRIPTION

Figure 1:
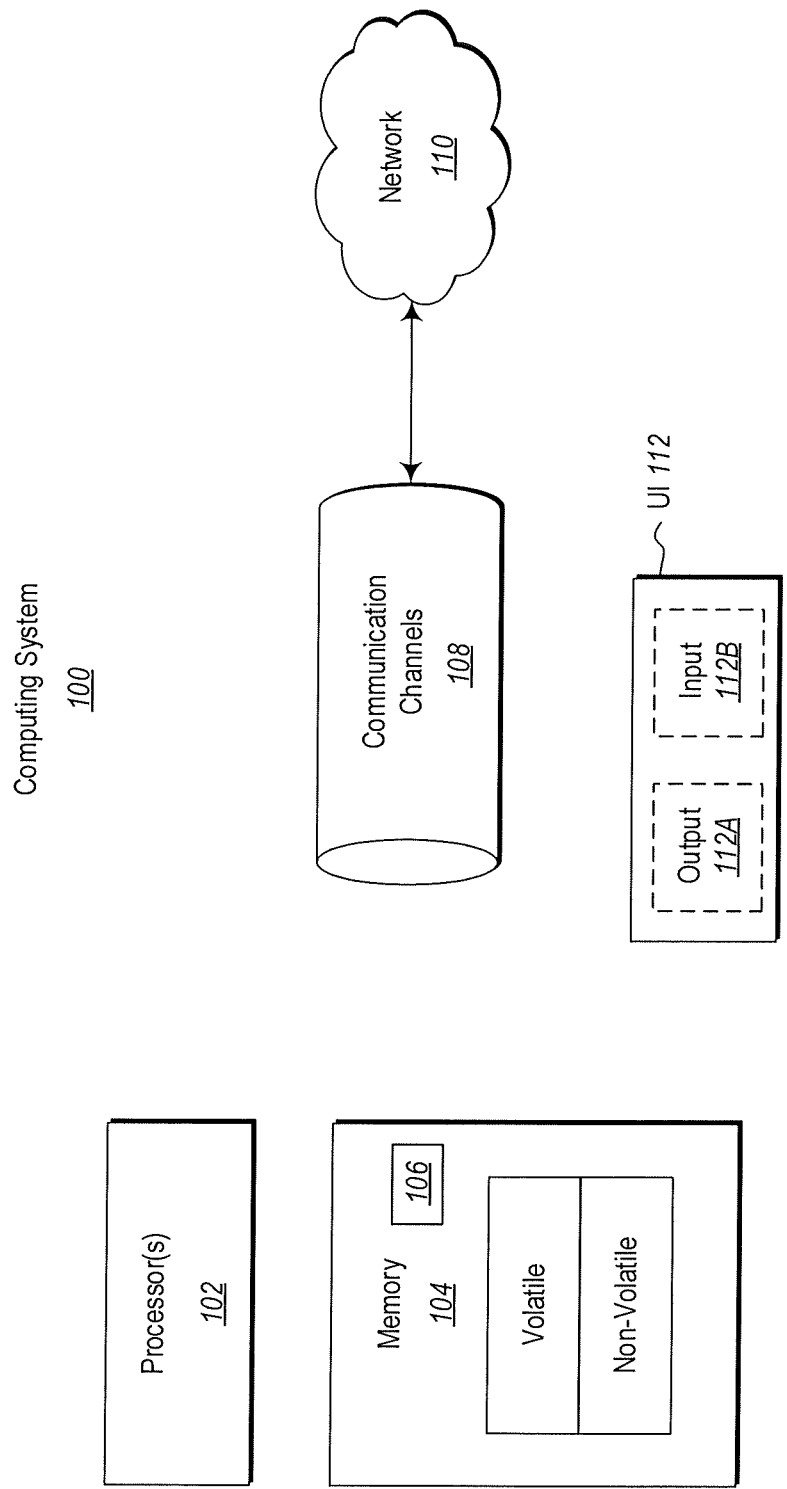
FIG. 1 illustrates an example computer architecture that facilitates operation of the principles described herein.

In the realm of Internet of Things (IoT) devices, there are unique challenges associated with managing the devices, including challenges in managing a representation of the devices as they relate to their physical environment, challenges with handling the vast amounts of data generated by the devices, and challenges with managing user access to the devices and user access rights for associating devices with spaces. For instance, a large organization may own several campuses in different geographical locations. Each of these campuses could be made of a large number of buildings, each of which could have many floors. Each of these floors, in turn could have a large number of physical spaces (e.g., conference rooms, offices, common areas, laboratories, etc.). Each of these physical spaces could include a number of objects, such as desks, chairs, lab equipment, etc. Each of these physical spaces and/or objects in the physical spaces could be associated with a number of IoT devices, each of which could include a number of sensors other data-generating hardware. Prior approaches have failed to efficiently represent these physical spaces and IoT devices, while providing efficient access to the data generated by the IoT devices. Additionally, prior approaches have failed to provide efficient mechanisms for managing user access as it relates to devices (e.g., user access rights for accessing sensor data and/or user access rights for managing the devices themselves), and/or for managing user access as it relates to physical spaces (e.g., for managing the layout of spaces including their sub-spaces, for managing adding/removing/managing devices in spaces, and so forth). For instance, for a large organization, placing all of this data in a single hierarchical graph could result in a graph that is very large both in terms of depth and breadth—and which would require expensive graph traversal operations every time sensor data needs to be updated or accessed.

In view of this recognition, the inventors have invented a multi-database environment for storing such data. In particular, the multi-database environment can include one or more first data structures (e.g., one or more graphs) that store relatively static information in the form of a topology of an environment in which the IoT devices exist, including storing references to the devices themselves. The first data structure(s) are configured to facilitate queries that can quickly identify spaces (e.g., physical spaces or virtual spaces), users, and/or IoT device(s) within the spaces—regardless of the size of the topology; quick queries could mean a tradeoff that operations updating the first data structure(s) is comparatively expensive. Notably, spaces may be physical spaces (e.g., rooms, floors, buildings, and so forth) or virtual/logical spaces (e.g., tenants, customers, and so forth).

Additionally, the first data structure(s) are configured to be easily modified with properties, attributes, and so forth associated with nodes of the first data structure. Such modification may allow for flexibility in managing devices located within a host of different types of physical environments. The multi-database environment can also include one or more second data structures that store relatively dynamic information, such as sensor data generated by the IoT devices. The second data structure(s) are configured to efficiently store constantly changing data, and to provide quick access to data generated by an IoT device once that device has been identified using the first data structure(s). Users may be managed within the first data structure(s) (e.g., as user nodes associated with device nodes and/or with nodes relating to physical spaces) and/or within the second data structure(s).

Some introductory discussion of a computing system will be described with respect to FIG. 1. Then, generating property keys associated with nodes of a hierarchical graph that is configured to provide access to sensor data from devices within a physical space, consistent with the multi-database environment introduced above, will be described with respect to FIGS. 2 through 9.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "service", "engine", "module", "control", or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface 112 for use in interfacing with a user. The user interface 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes NAND flash memory or other flash memory, RAM, DRAM, SRAM, ROM, EEPROM, CD-ROM or other optical disk storage, solid-state disk storage, magnetic disk storage or other storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, traditional computing systems such as smartphones, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses, watches, etc.) and the like. In modern computing systems, in the age of Internet of Things (IoT), computing system configurations may be virtually any type of device including (but most certainly not limited to) smart luggage, smart clothing, smart jewelry, smart drinking bottles, smart skate boards, smart golf clubs, smart toys, smart brewing machines, smart wallets, smart home and business automation gear, smart appliances, smart furniture, etc. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Reference is made frequently herein to IoT devices. As used herein, an IoT device can include any device that is connected to a network (whether that be a personal area network, local area network, wide area network, and/or the Internet) and that interacts with a physical environment (whether that be to control or influence some aspect of a physical environment, and/or to receive sensor data from a physical environment). As such, references to IoT devices herein should be interpreted broadly to include vast categories of devices, regardless of how those devices may be named or marketed. From a computing perspective, IoT devices may range from fairly complex (e.g., such as being embodied on a general-purpose computer system), to fairly simple (e.g., such as being embodied within a special-purpose microcontroller environment).

Figure 2:
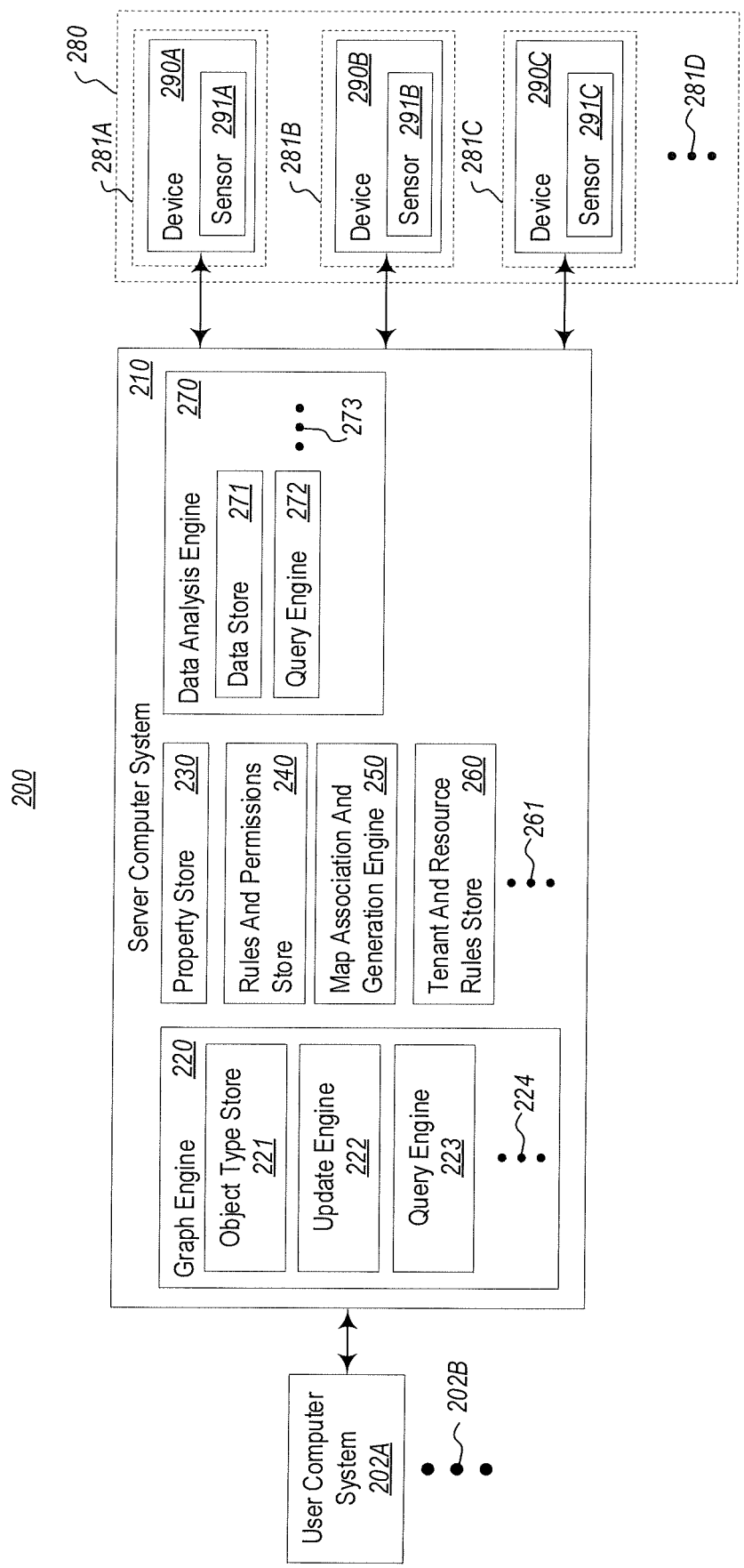
FIG. 2 illustrates an example environment for providing access to sensor data from devices within a physical space.

FIG. 2 illustrates an example environment 200 for providing access to sensor data from devices within a space (e.g., a physical or virtual space). As illustrated, the environment 200 includes a user computer system 202A. The user computer system 202A may be embodied, for example, by computer system 100, as described with respect to FIG. 1. The user computer system 202A may comprise any type of computer system that is configured to communicate with, and utilize the functionality of, a server computer system 210, which is described later. In an example, the user computer system 202A may comprise a desktop computer, a laptop computer, a tablet, a smartphone, and so forth. Notably, while the environment 200 includes a single user computer system 202A, the ellipses 202B represents that any number of user computer systems may communicate with, and utilize the functionality of, the server computer system 210.

The server computer system 210 is configured to receive, store, and provide access to sensor data from devices (such as IoT devices) located within a space (e.g., a room within a building), as further described herein. Again, the server computer system 210 may be embodied, for example, by computer system 100, as described with respect to FIG. 1. The server computer system 210 may comprise any type of computer system, including any combination of hardware and/or software that is configured to provide access to sensor data from devices located within particular spaces.

As shown, the server computer system 210 may include various engines, functional blocks, and components, including (as examples) a graph engine 220, a property store 230, a rules and permissions store 240, a map association and generation engine 250, a tenant and resource rules store 260, and a data analysis engine 270, each of which may also include additional engines, functional blocks, and components (e.g., an object type store 221 within the graph engine 220). The various engines, components, and/or functional blocks of the server computer system 210 may be implemented on a single computer system, or may be implemented as a distributed computer system that includes elements resident in a cloud environment, and/or that implement aspects of cloud computing (i.e., at least one of the various illustrated engines may be implemented locally, while at least one other engine may be implemented remotely). In addition, the various engines, functional blocks, and/or components of the server computer system 210 may be implemented as software, hardware, or a combination of software and hardware.

Notably, the configuration of the server computer system 210 illustrated in FIG. 2 is shown only for exemplary purposes. As such, the server computer system 210 may include more or less than the engines, functional blocks, and/or components illustrated in FIG. 2. In particular, the ellipses 261 represent that any number of engines, functional blocks, and/or components may be utilized within the server computer system. Although not illustrated, the various engines of the server computer system 210 may access and/or utilize a processor and memory, such as the processor 102 and the memory 104 of FIG. 1, as needed, to perform their various functions.

Figure 3:
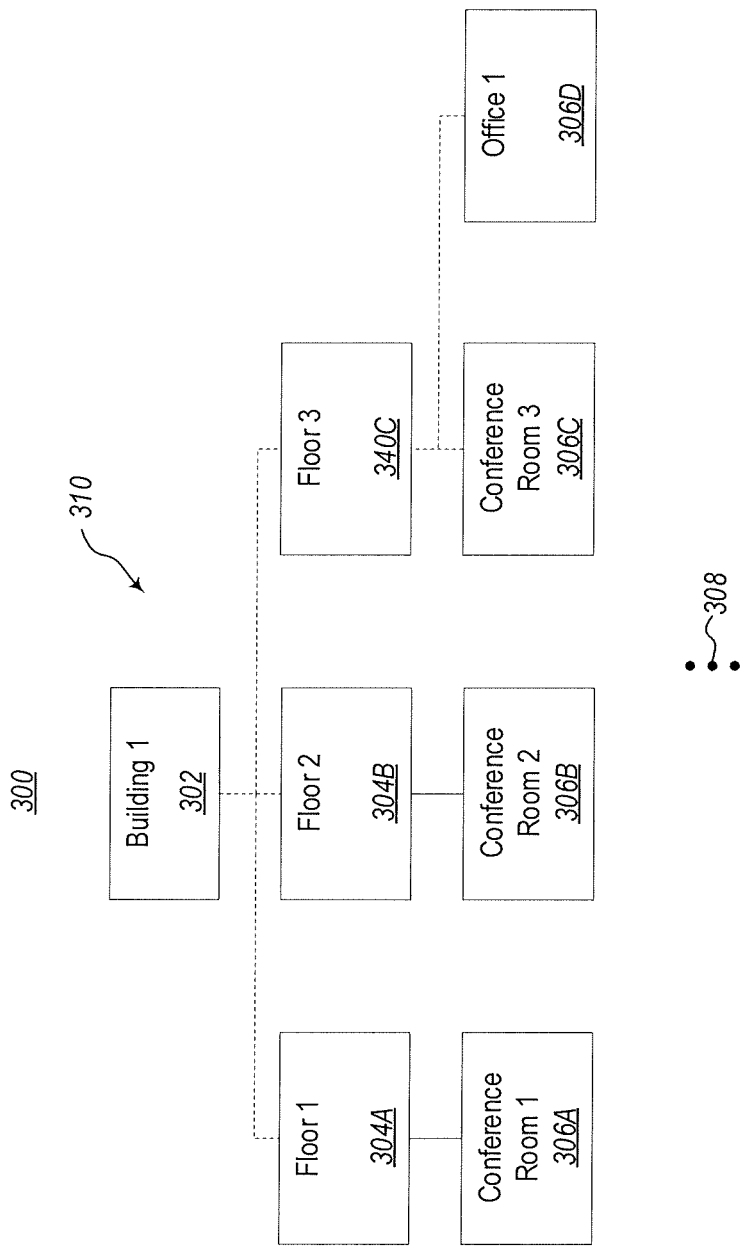
FIG. 3 illustrates an example hierarchical graph associated with a physical space.

As briefly introduced, the server computer system 210 includes the graph engine 220, the property store 230, the rules and permissions store 240, the map association and generation engine 250, the tenant and resource rules store 260, and the data analysis engine 270. The graph engine 220 may be configured to generate, store, and/or manage one or more hierarchical graphs (e.g., hierarchical graph 310 of FIG. 3) that defines a topology of areas and sub-areas of a physical space. For instance, FIG. 3 illustrates a hierarchical graph 310 that includes a topology of nodes associated with a physical space comprising "building 1" (e.g., building node 302). The hierarchical graph 310 also represents areas and sub-areas of "building 1," such as different floors (i.e., floor node 304A, floor node 304B, and floor node 304C, all of which are sub-nodes of building node 302), as well as different rooms (i.e., conference room node 306A, conference room node 306B, conference room node 306C, and office node 306D) associated with each floor. Although not shown, each of the room nodes 306A-306A could be associated with additional sub-nodes representing physical objects in the rooms, such as desks, chairs, tales, computer, lab equipment, etc.

Figure 4:
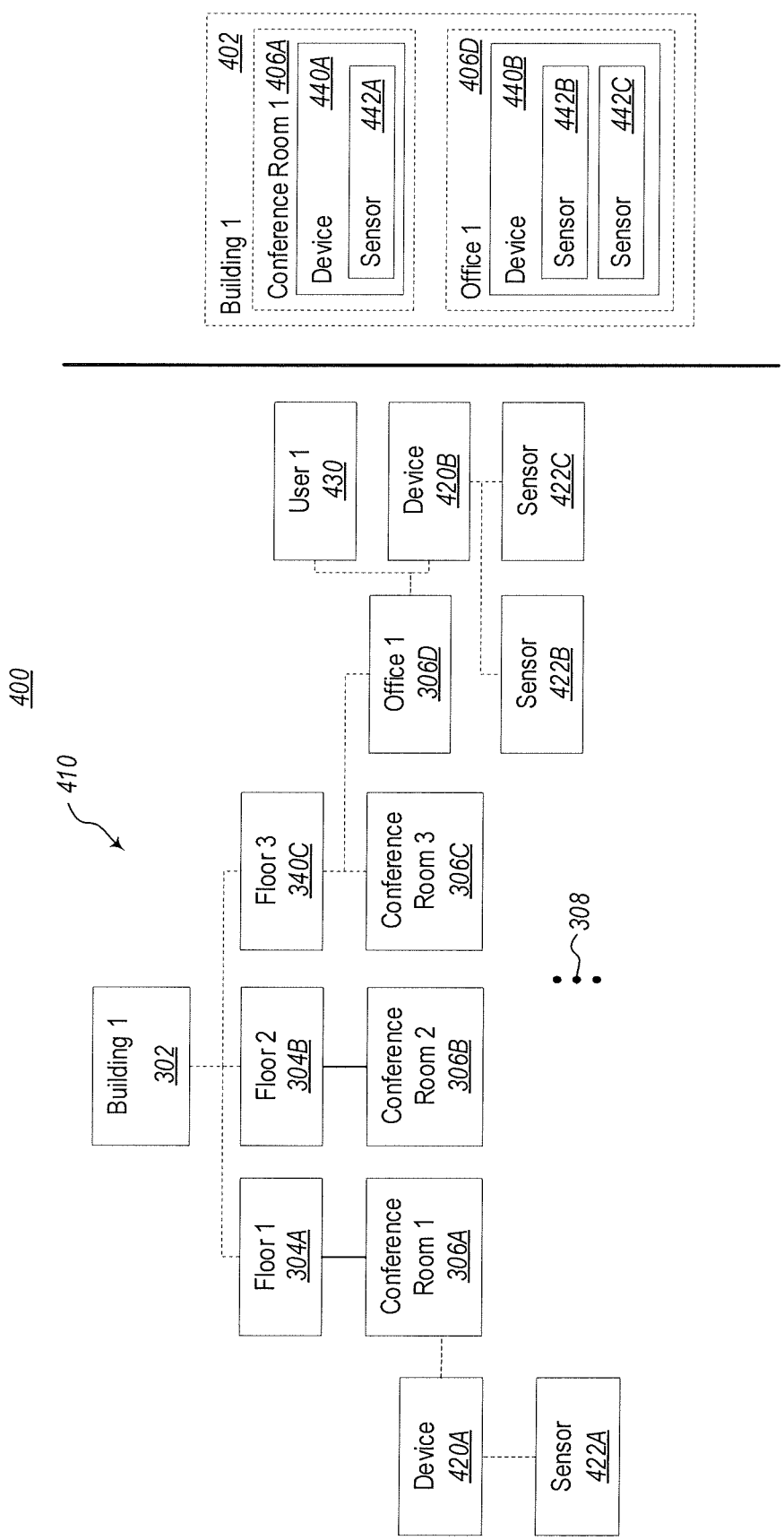
FIG. 4 illustrates an example hierarchical graph associated with a physical space and devices associated with areas or sub-areas of the physical space.

Any node in the hierarchical graph 310 could be associated with devices/sensors and/or users. For example, the various room nodes (i.e., the conference room node 306A and the office node 306D) may also be associated with devices and sensors, and the room nodes and/or the device/sensor nodes may be associated with user nodes. Similarly, FIG. 4 shows a related graph 410, that includes device nodes 420A and 420B and sensor nodes 422A-422C. While only seven nodes associated with areas/sub-areas are illustrated in FIG. 3, the ellipses 308 represents that any number of nodes that are associated with areas/sub-areas and devices/sensors may be utilized when practicing the principles described herein (whether those nodes be added or deleted in a horizontal direction (breadth) or a vertical direction (depth)). Furthermore, the topology of the graph may be continuously modified via adding or deleting nodes of the graph (in a horizontal direction or vertical direction). For instance, using the example of FIG. 3, a number of additional building nodes associated with different buildings than building 1 (corresponding to building node 302), each of which additional buildings may include additional nodes corresponding to floors, rooms, and so forth, may also be included within the graph 310.

In some embodiments, the hierarchical graph 310 may be stored within a relational database, though any type of database could be used. Additionally, regardless of the type of graph used, the full paths in the graph for each given node may be stored as metadata in the node to increase the performance and efficiency of querying the hierarchical graph 310. In this way, identification (e.g., via a query) of any ancestral node or child node (i.e., children nodes, grandchildren nodes, great-grandchildren nodes, and so on) of a given node may be performed in an order of one operation (i.e., an O(1) operation). For instance, a query that requests each node having a path that starts with "building1/floor3" (i.e., corresponding to the floor node 304C) may identify conference room 3 and office 1 (i.e., corresponding to conference room node 306C and office node 306D, respectively) as being children of the floor node 304C in an O(1) operation.

Notably, even if the conference room node 306C and the office node 306D were grandchildren, great-grandchildren, and so on, of the floor node 304C, a request for identification of each node having a path that starts with "building1/floor3" could result in identification of the conference room node 306C and the office node 306D (as well as any nodes between the floor node 304C and the conference room node 306C/the office node 306D) in an O(1) operation. Accordingly, paths associated with each node may be automatically computed and saved, which effectively tracks a primary identification for each node of the graph. While a cost is incurred upfront to generate and store each path (e.g., in connection with the addition and/or removal of one or more nodes to within the graph), the graph may be quickly and efficiently traversed to identify nodes and relationships between nodes within the graph than traditional traversing of graphs. By storing primarily static information in the graph, however, the need to generate/store these paths can be relatively infrequent.

Returning to FIG. 2, as illustrated, the graph engine 220 includes various components that may comprise any combination of appropriate hardware and/or software, including an object type store 221, an update engine 222, and a query engine 223. Notably, the ellipses 224 represents that any number of components may be included with the graph engine 220 (i.e., more or less than the components illustrated within the graph engine 220).

The object type store 221 comprises a data store of node object types that can be selected to create additional nodes within the graph 310. For instance, in addition to the node object types of buildings, floors, and rooms that are explicitly shown in FIG. 3, any number of object types associated with areas/sub-areas of physical spaces (as well as devices/sensors and users/individuals, as further described herein) may be used within the graph 310, including but not limited to organizations (e.g., businesses), geographic regions (e.g., continents, countries, states, cities, counties, and so forth), types of areas (e.g., buildings, farms, houses, apartments, conference rooms, offices, bathrooms, breakrooms, study areas, desks, chairs, and so forth), types of devices (e.g., thermostat, projector, paper towel dispenser, television, computer, and so forth), types of sensors (e.g., thermocouple, thermistor, humidity sensor, $CO_2$ sensor, Geiger counter), and so forth. Additionally, the object type store 221 may be extensible, such that additional object types may be created on demand.

The update engine 222 may be configured to update the hierarchical graph 310 with any changes made to the graph. For instance, the update engine 222 may update the graph with additional nodes, update the graph with less nodes (e.g., deleted nodes), update nodes with new or modified properties, update nodes with new or modified paths, and perform any other operations associated with modifying or updating the graph.

The query engine 223 may be configured to allow for performing queries to the hierarchical graph 310. In particular, the query engine 223 may be configured to receive queries, generate query plans, build responses to queries, and/or perform any other operations associated with receiving and responding to queries of the hierarchical graph 310.

As briefly introduced, the server computer system 210 further includes data analysis engine 270. The data analysis engine 270 may be configured to receive, gather, manage, and process data received from devices/sensors located within a physical space (associated with the hierarchical graph that defines the topology of the physical space). For instance, FIG. 2 illustrates various devices and sensors located within a physical space 280. In particular, the physical space 280 comprises various areas and sub-areas, including area/sub-area 281A, area/sub-area 281B, and area/sub-area 281C. Each of the sub-areas includes a single device having a single sensor (i.e., area/sub-area 281A includes device 290A having sensor 291A, area/sub-area 281B includes device 290B having sensor 291B, and area/sub-area 281C includes device 290C having sensor 291C). Notably, while each of the areas/sub-areas within the physical space 280 includes a single device having a single sensor, the ellipses 290 represents that there may be any number of areas/sub-areas within the physical space 280, each of the areas/sub-areas including any number of devices having any number of sensors (including zero devices/sensors).

Notably, the devices and sensors may include any type of devices/sensors, including but not limited to devices/sensors associated with detecting temperature, $CO_2$, light, pressure, toxic chemicals, humidity, and so forth. As such, the combination of the devices 290 (i.e., the device 290A through the device 290C) and the sensors 291 (i.e., the sensor 291A through the sensor 291C) may be configured to capture sensor data (e.g., changes in temperature) and send the captured data to the data analysis engine 270. The sensors may provide data to the data analysis engine 270 periodically and/or continuously. Thus, in some implementations, sensors the data analysis engine 270 may receive, gather, manage, and process real-time or near real-time data received from the sensors. The sensors may actively push data to the data analysis engine 270, or may only provide it upon request.

The data analysis engine 270 may then be configured to receive, gather, manage, and process data received from such devices/sensors. In particular, as illustrated, the data analysis engine 270 may include a data store 271 that is configured to organize, store, and allow access to received sensor data. The data store 271 may comprise any type of data store that is configured to manage dynamic, frequently changing data such as sensor data, and that provides quick and efficient performance. In an example, the data store 271 may comprise a key-value database. For instance, the data store 271 may comprise a REDIS™ CACHE. While the data store 271 may store some data permanently, the data store 271 may only store some data temporarily. For example, when receiving real-time or near real-time data, the data analysis engine 270 may processes large quantities of data, making it infeasible and/or undesirable to store it permanently. Data associated with a particular device (e.g., sensor data) may also be linked with device nodes of the hierarchical graph (e.g., the hierarchical graph 410), such that upon identification of a device node within the hierarchical graph, sensor data associated with the device corresponding to the device node may also be accessed, as further described herein.

As shown, the data analysis engine 270 further includes a query engine 272. The query engine 272 may be configured to allow for performing queries to the data store 271. In particular, the query engine 272 may be configured to receive queries, generate query plans, build responses to queries, and/or perform any other operations associated with receiving and responding to queries of the data store 271.

FIG. 4 illustrates an environment 400 including hierarchical graph 410 comprising area/sub-area nodes, as well as device/sensor nodes that are each associated with one or more area/sub-area nodes. As shown, the conference room node 306A is associated with device node 420A (having a corresponding sensor node 422A) and the office node 306D is associated with the device node 420B (having two corresponding sensor nodes, the sensor node 422B and the sensor node 422C). Additionally, FIG. 4 includes a representation of an actual physical space 402 (associated with building 1) that corresponds to the building node 302.

As illustrated, the physical space 402 also comprises conference room 406A (associated with conference room 1 and corresponding to the conference room node 306A) that includes the actual physical device 440A having the sensor 442A, as well as office 406D (associated with office 1 and corresponding to the office node 306D) that includes the actual physical device 440B having both the sensor 442B and the sensor 442C. In a specific example, the device 440A may correspond to a thermostat that includes a thermocouple (i.e., the sensor 442A) for measuring temperature. Such temperature measurements may then be sent to the data analysis engine for managing, storing, and processing the received sensor data.

Additionally, as illustrated in FIG. 4, user nodes (e.g., user node 430) may be included within the hierarchical graph 410 as being associated with one or more area/sub-area nodes (though they could additionally, or alternatively, be associated with sensor/device nodes). In particular, FIG. 4 shows the user node 430 being associated with the office node 306D. In a specific example, the user 1 (i.e., corresponding to the user node 330) may comprise an individual that has been assigned to office 1 (i.e., corresponding to the office node 306D). In this example, user node 430 could be used to control a user's access to office node 306D, including, for example, the user's ability to modify office node 306D, to attached nodes to office node 306D, remove nodes from office node 306D, or modify nodes that are already attached to office node 306D, etc. In some embodiment, associating user node 430 with office node 306D applies the user node's permissions to all nodes hierarchically below office node 306D in hierarchical graph 410. Similar application of access rights could apply when associating a user node with a sensor/device node.

Notably, regardless of object/node type (e.g., area/sub-area nodes, device nodes, sensor nodes, user nodes), data and/or metadata associated with the node may be stored in the hierarchical graph (e.g., the hierarchical graph 310 or the hierarchical graph 410), the data store 271 of the data analysis engine 270, or any other appropriate location associated with the server computer system 210.

As briefly introduced, the server computer system 210 further includes property store 230, rules and permissions store 240, map association and generation engine 250, and tenant and resource store 260. The property store 230 may comprise a data store that includes properties associated with nodes of the hierarchical graph 310. For instance, particular properties may automatically be associated with particular object types (i.e., node types), as well as children of such object types. In a more particular example, a property associated with occupancy of a chair within a room may propagate to the room itself (i.e., showing that the room is occupied). Furthermore, as discussed with respect to the object type store 231, the property store may also be extensible, such that properties may be created and associated with any given node, and potentially associated with ancestral or children nodes of the given node.

The rules and permissions store 240 may include various rules and permissions associated with particular roles assigned to users. For instance, based on a particular role (e.g., an administrator) or permissions assigned to a user, the user may have access to perform various operations, including adding/deleting nodes, modifying nodes, accessing/modifying functionality of various devices (e.g., locking doors), and so forth. The rules/permissions stored in the rules and permissions store 240 may be applied to various nodes in the hierarchical graph, whether those be area/sub-area nodes, sensor/device nodes, or user nodes. The rules/permissions stored in the rules and permissions store 240 may additionally, or alternatively, be applied to data in the data store 271. In some embodiments, user nodes that are associated with nodes in the graph (e.g., areas or devices/sensors) grant corresponding users access to the associated node, and user rules/permissions associated with those user nodes are managed in the rules and permissions store 240.

The map association and generation engine 250 may be configured to perform numerous functions with respect to associating maps with the hierarchical graph (and devices providing data to the data store), and/or generating the hierarchical graph, itself. For instance, the map association and generation engine 250 may be able to generate the hierarchal graph 300 based on user input and/or based on a map. In another example, the map association and generation engine 250 may be able to link nodes of the hierarchical graph to locations or devices included within a map. In yet another example, the map association and generation engine 250 may further be able to generate a map based on information included within the hierarchical graph corresponding to nodes of the hierarchical graph.

The tenant and resource rules store 260 may include rules associated with how resources, permissions, properties, and so forth are to be handled for each given entity (e.g., tenant) that utilizes the hierarchical graph.

Notably, the ellipses 261 represent that the server computer system 210 may include any number of components (i.e., whether more or less) than the components illustrated within the server computer system in FIG. 2. For instance, while both the graph engine 220 and the data analysis engine 270 include corresponding query engines (i.e., the query engine 223 and the query engine 272, respectively), an overarching query engine may be included within the physical analytics computer system that allows for querying both the graph engine 220 and the data analysis engine 270. In this way, a user may be able to generate queries that can traverse the hierarchical graph (e.g., the hierarchical graph 410) to identify one or more devices associated with a particular area/sub-area of the hierarchical graph, as well as current (or previous) sensor data associated with the one or more devices via the data store 271 and the data analysis engine 270.

Figure 5:
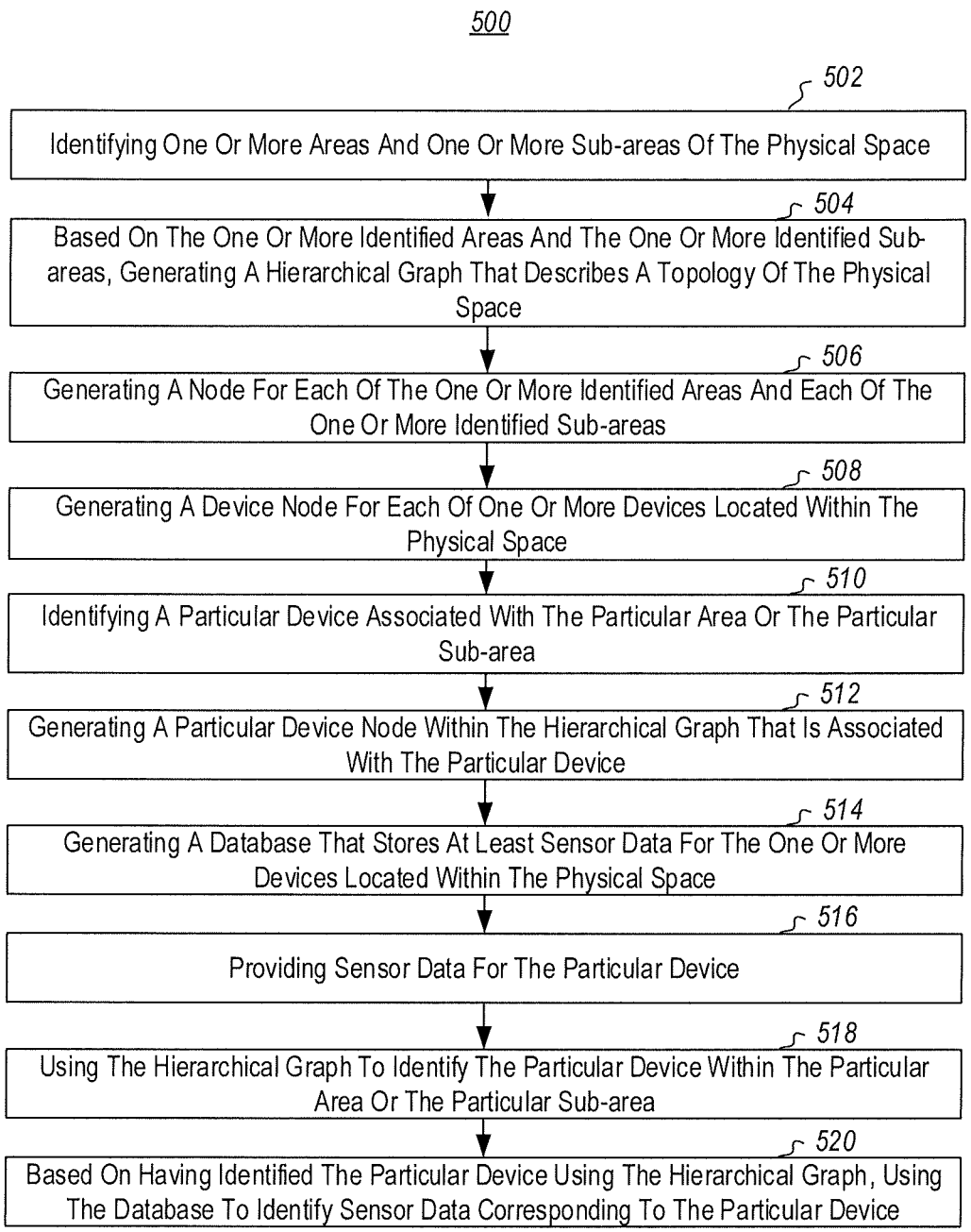
FIG. 5 illustrates a flowchart of a method for providing access to sensor data from devices within a physical space.

FIG. 5 illustrates a flowchart of a method 500 for providing access to sensor data from devices within a physical space. The method 500 is described with frequent reference to the environments of FIGS. 2-4. As shown, the method 500 includes identifying one or more areas and one or more sub-areas of the physical space (Act 502). For instance, the building 402, the conference room 406A, and/or the office 406D of FIG. 4 may be identified by the map association and generation engine 250. The method 500 further includes, based on the one or more identified areas and the one or more identified sub-areas, generating a hierarchical graph that describes a topology of the physical space (Act 504). For instance, based on the identification of the building 402 (and its corresponding areas/sub-areas), the hierarchical graph 410 may be generated by the map association and generation engine 250.

Generating the hierarchical graph further includes generating a node for each of the one or more identified areas and each of the one or more identified sub-areas (Act 506). For example, the hierarchical graph 410 includes various nodes based on an identification of areas/sub-areas associated with the building 402. Generating the hierarchical graph also includes generating a device node for each of one or more devices located within the physical space (Act 508). For instance, an identification of the device 440A and the device 440B may result in generating the device node 420A and the device node 420B, respectively.

Generating the device node for each of one or more devices located within the physical space further includes, for a particular one of the one or more areas or the one or more sub-areas, identifying a particular device associated with the particular area or the particular sub-area (Act 510). The particular device may include one or more sensors that generate data. For example, the device 440A may be identified, as well as the sensor 442A.

Generating the device node for each of one or more devices located within the physical space further includes, for a particular one of the one or more areas or the one or more sub-areas, generating a particular device node within the hierarchical graph that is associated with the particular device (Act 512). The particular device node may be a sub-node of a particular node that was generated for the particular area or the particular sub-area. For instance, the device node 420A may be generated in response to identifying the device 440A, and may further be associated with a particular area/sub-area node (i.e., the device node 420A being associated with the conference room node 306A). Additionally, any sensors associated with the device 440A may be identified, including the sensor 422A.

The method 500 further includes generating a database that stores at least sensor data for the one or more devices located within the physical space (Act 514). The database may be associated with, but separate from, the hierarchical graph. For example, the data store 271 may be generated for managing, storing, and accessing received sensor data. The method 500 may further include providing sensor data for the particular device (Act 516). For example, data from the sensor 442A of device 440A may be provided to the data store 271. In a more specific example, the sensor 442A may be configured to measure $CO_2$ levels, which measurements may be provided by the device 440A (or by another device capable of communicating with the device 440A) to the data store 271 (and ultimately, the data analysis engine 270).

Providing sensor data for the particular device may also include using the hierarchical graph to identify the particular device within the particular area or the particular sub-area (Act 518). For example, a query provided to the server computer system 210 (and perhaps directly to the graph engine 220) may request an identification of each device (and therefore each device node) associated with a particular area/sub-area (and therefore the particular area/sub-area node corresponding to the particular area/sub-area). Providing sensor data for the particular device may further include, based on having identified the particular device using the hierarchical graph, using the database to identify sensor data corresponding to the particular device (Act 520). For instance, upon identifying the device/device nodes (and the corresponding sensors/sensor nodes), sensor data associated with the devices/sensors may then be identified within the data store 271.

Accordingly, the principles described herein may allow for logically organizing devices (e.g., Internet of Things (IoT) devices) and/or users based on physical spaces (or areas/sub-areas of physical spaces), thus allowing for both intuitive organization, access, and control of a plurality of devices, as well as efficient use of such devices. For instance, each device associated with a particular area/sub-area (e.g., on a particular floor of a building or a particular room) may be easily shut off or placed in a reduced power state, as location-based groupings of devices are automatically created. In particular, relatively static physical space data (e.g., data regarding floors and rooms of a building) may be placed in a reliable graph (e.g., a relational database), while more dynamic sensor data may be managed in a more dynamic database (e.g., a key-value database such as a REDIS CACHE).

The reliability of a hierarchical graph may be supplemented with quickness/efficiency by computing and storing paths associated with each node upfront when adding/removing/modifying nodes in the graph. Computing and storing the paths may then allow for performing queries with respect to ancestral nodes or child nodes of any given node in an O(1) operation. The hierarchical graph and the dynamic database may then be linked such that sensor data stored at the dynamic database may be quickly accessed when querying nodes associated with an area/sub-area within the hierarchical graph. Accordingly, storing the hierarchical graph and the dynamic database within an improved computer system (e.g., within memory and/or persistent storage) may improve the speed and efficiency of the computer system with respect to traversing the hierarchical graph in response to queries, building responses to queries (e.g., surfacing live sensor data associated with a particular area or sub-area of a physical space corresponding to the hierarchical graph), and so forth.

Figure 6:
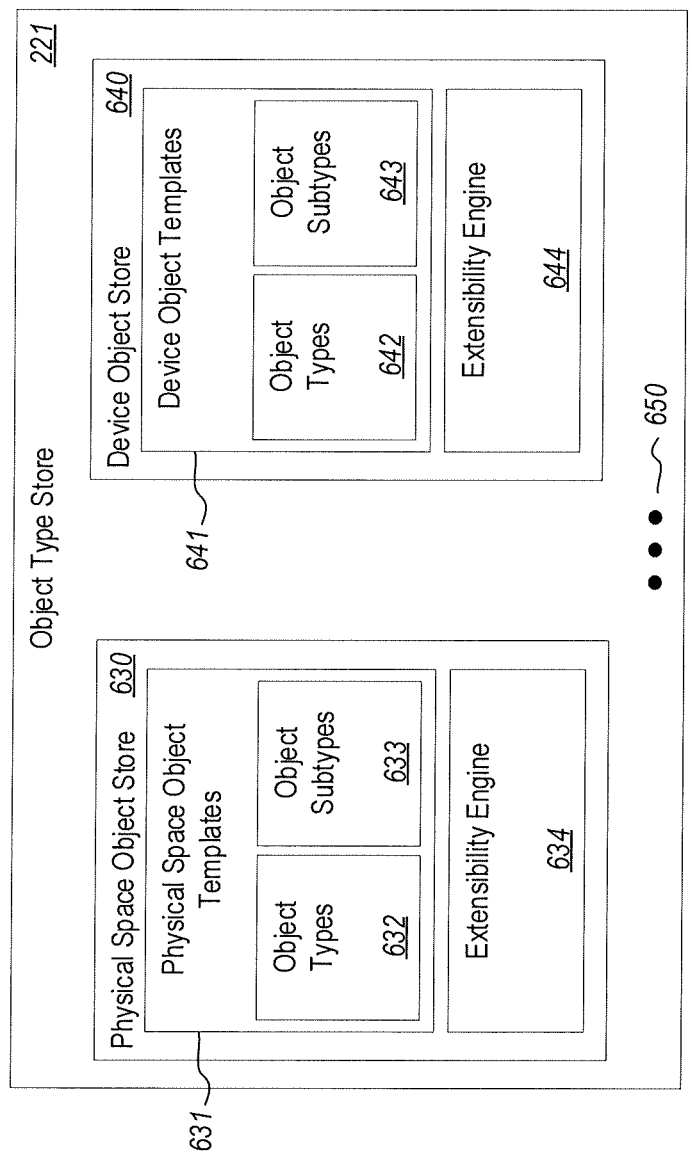
FIG. 6 illustrates a more specific embodiment of an object type store.

FIG. 6 illustrates a more specific embodiment of the object type store 221, as illustrated in FIG. 2. As shown, the object type store 221 may further include a physical space object store 630 and a device object store 640, while the ellipses 650 illustrates that any number of additional components (e.g., a user object store) may also be included within the object type store 221. As illustrated, the physical space object store 630 includes physical space object templates 631 that comprise a plurality of physical space object types 632 and physical space object subtypes 633. More particularly, each given physical space object type 632 may include one or more object subtypes 633 associated with the given object type. In a specific example, a physical space object type may comprise a room object type, which includes a plurality of associated room object subtypes, including a conference room object, an office object, a classroom object, a bathroom object, and so forth.

Figure 7:
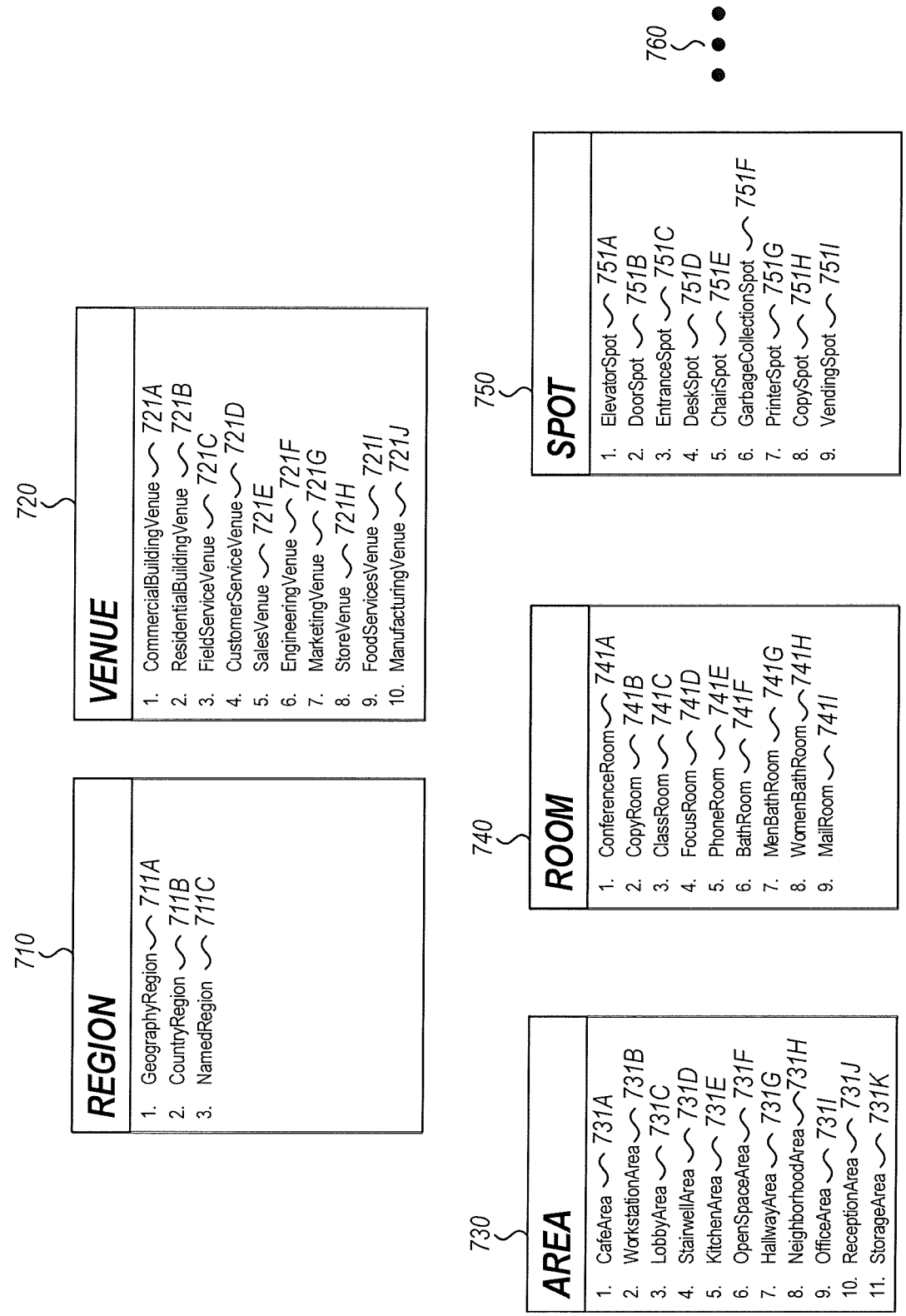
FIG. 7 illustrates a number of object types associated with physical spaces and areas of physical spaces.

FIG. 7 illustrates various examples of physical space types 632 and subtypes 633 associated with each of the physical space types. In particular, FIG. 7 includes object type 710 (i.e., region object type) through object type 750 (i.e., spot object type), each object type of which includes a plurality of associated object subtypes (e.g., object subtype 711A through object subtype 711C associated with region object type 710, object subtype 721A through object subtype 721J associated with venue object type 720, object subtype 731A through object subtype 731K associated with area object type 730, object subtype 741A through object subtype 741I associated with room object type 740, and object subtype 751A through object subtype 751I associated with spot object type 750). Notably, while only five object types (i.e., object type 710 through object type 750) are illustrated in FIG. 7, the ellipses 760 represents that any number of object types (and/or object subtypes) may be utilized when practicing the principles described herein.

For instance, as illustrated in FIG. 6, the physical space object store 630 includes an extensibility engine 634. The extensibility engine 634 may allow for creating additional object types and subtypes associated with newly created object types, as well as subtypes for already-existing object types. In an example, a user may create additional subtypes associated with the area object type 730, such as, for example, an auditorium object subtype, a parking lot object subtype, a fitness area object subtype, and the like. In another example, a user may create additional subtypes associated with the room object type 740, such as, for example, an office object subtype, a lab object subtype, a break room object subtype, a server room object subtype, a patient room object subtype, a surgery room object subtype, and the like. In yet another example, a user of the hierarchical graph that would like to monitor devices positioned within various locations of a farm may create object types and subtypes (and ultimately nodes within the hierarchical graph associated with the created object types and subtypes) such as 'Farm,' 'Plot,' 'Crop,' 'Row,' and so forth.

Returning to FIG. 6, the device object store 640 includes device object templates 641 that comprise a plurality of device object types 642 and device object subtypes 643. More particularly, each given device object type 642 may include one or more object subtypes 643 associated with the given object type. In some embodiments, device object types 641 may comprise a particular device, while an object subtype 643 associated with the particular device may comprise a sensor object subtype. In a specific example, a device object type may comprise a thermostat object type, which includes a plurality of associated thermostat sensor object subtypes, including a thermocouple object, a thermistor object, and so forth.

In other embodiments, object types or object subtypes may be associated with particular types of sensors (i.e., a sensor type object type/subtype). Additionally, each sensor type object type/subtype may further include an object subtype associated with a measurement/generated sensor data (e.g., detected changes in environment) or a measurement type/generated sensor data type of the sensor. For instance, a thermostat object type/subtype (or a thermocouple/thermistor object type/subtype) may have an associated subtype comprising temperature, which temperature may be further defined as being an outdoor temperature, an indoor temperature, a central processing unit (CPU) temperature, and so forth. Sensor types/subtypes (i.e., measurement/generated sensor data type/subtype) may further include associated types/subtypes comprising units of measurement/units of generated sensor data. In an example using a thermostat (and ultimately, temperature) as an object type/subtype, a temperature type/subtype (whether further defined as indoor temperature, outdoor temperature, and so forth) may include associated subtypes of units of temperature, including Fahrenheit, Celsius, and Kelvin.

Accordingly, options for choosing subtypes associated with a given object type may be strongly typed (i.e., options may come from a finite list of options). For example, a limited number of sensor data unit subtypes associated with a given sensor data type may be selected by a user. In a more particular example, sensor data unit subtypes associated with a sensor data type of temperature may include 'Fahrenheit,' 'Celsius,' and 'Kelvin.' However, as illustrated in FIG. 6, the device object store includes 221 an extensibility engine 644. The extensibility engine 644 may allow for creating additional object types and subtypes associated with newly created object types, as well as subtypes for already-existing object types, as further described herein. As such, even when options are strongly typed, new options may be added via the extensibility engine. In some embodiments, adding additional types/subtypes may be limited to authorized users (e.g., administrators) based on rules of the rules and permissions store 240.

Notably, while types and subtypes are discussed as being extensible herein, in some embodiments, types and subtypes may be pre-defined, such that types and subtypes are not extensible. In addition, sensor data unit types (i.e., units of measurement being captured by a given sensor) may be crucial for further processing performed by the server computer system 210 (and ultimately, the data analysis engine 270), which processing is further described herein. Such data/metadata (e.g., types/subtypes) may be stored within the hierarchical graph (e.g., the hierarchical graph 310, the hierarchical graph 410, and so forth) and/or the data store 271. Regardless of the storage location, data/metadata associated with types and subtypes may be accessible by both the hierarchical graph (and graph engine 220) and the data analysis engine 270.

Figure 8:
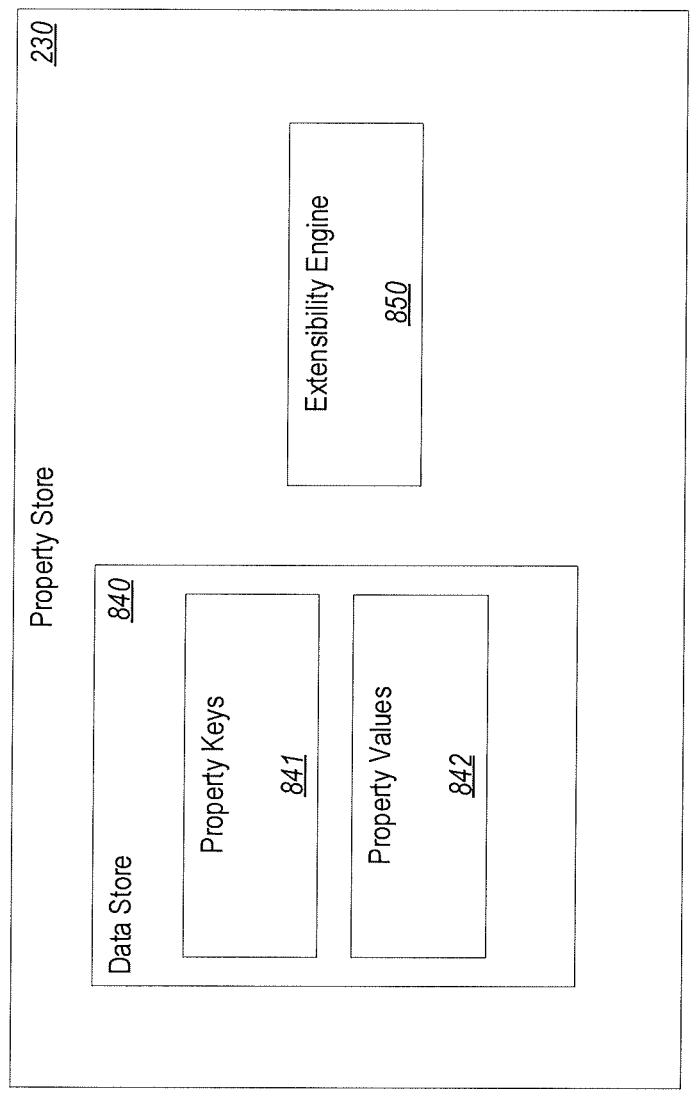
FIG. 8 illustrates a more specific embodiment of a property store.

FIG. 8 illustrates a more specific embodiment of the property store 230, as illustrated in FIG. 2. As shown, the property store 230 includes a data store 840 comprising property keys 841 and property values 842, as well as an extensibility engine 850. The property keys 841 may comprise any properties that can be associated with one or more objects/nodes of the hierarchical graph and defined with respect to a given node via the property values 842. Property keys associated with a particular node may then be propagated to each child node (i.e., including child nodes, grandchild nodes, great grandchild nodes, and so forth), such that a property value associated with the property key may be defined for any child node of the particular node for which the property key was created. Notably, property keys may be created for any given object of the hierarchical graph, including physical space object types, device object types, sensor object types, and user object types.

In an example, a property key associated with windows (i.e., whether or not the physical space associated with the node has windows) may be created for the building node 302 (i.e., building 1) of the hierarchical graph 310 of FIG. 3. In such an example, the windows property key may be propagated to each node shown in the hierarchical graph 310, as each node in the hierarchical graph 310 is a child node (or grandchild node) of the building node 302. As such, a property value associated with the windows property key may be made available for further defining the windows property for each node within the hierarchical graph 310.

In a more specific example, a property value associated with windows may include a strongly typed property value comprising a 'yes' or 'no' property value (i.e., 'yes, there are windows in the physical space associated with the given node' or 'no, there are not windows in the physical space associated with the given node') or '1,' '2,' '3,' '4,' '5,' and so forth property value (i.e., the number of windows within the physical space associated with the given node). In another example using the windows property key, a property value may be associated with a particular type of data (e.g., 'int,' 'string,' and so forth), such that a user may be able to input any value that corresponds to the particular type of data. In a more specific example, assume that the property value is associated with an 'int' data type. A user may then input any integer value (e.g., '1,' '2,', '3,' and so forth) to define the number of windows within the physical space associated with the given node.

In another specific example, assume that the property value is associated with a 'string' data type. A user may then input any string value (e.g., 'yes,' 'no,' 'one,' 'two,' and so forth) to define that window are present, the number of windows, and so forth, within the physical space associated with the given node. Accordingly, values may be strongly typed or may allow for a free form style of input that is constrained by the type of data being input. Additionally, while property keys may be propagated to, or inherited by, child nodes of a node to which a property key is associated, property values may be unique to each node (i.e., property values may not be propagated to, or inherited by, child nodes of a given node). In other embodiments, however, property values may be inherited by child nodes.

Any given property key may be associated with a particular object type (i.e., such that a node of the particular object type is automatically associated with the given property key upon creation) or may simply be associated with a particular node (regardless of the particular node's type) within the hierarchical graph. In an example, a property key may be associated only with physical space type nodes, only with device type nodes, only with sensor type nodes, or only with user type nodes. In another example, property keys may be associated only with particular types or subtypes of nodes. For instance, a property key may be associated with a room object type, a floor object type, a particular sensor object type, and so forth.

While a plurality of property keys may be pre-defined for a given hierarchical graph or nodes within the given hierarchical graph, as illustrated in FIG. 8, the property store includes an extensibility engine 850 that allows for creating additional property keys and property values that correspond to the additional created property keys. Furthermore, the extensibility engine may allow for creating additional property values for already-existing property keys, as well as any metadata associated with created property keys/property values (e.g., a name, a nickname, a description, an associated data type, and so forth). In some embodiments, only users having appropriate permissions (e.g., administrators) may be allowed to create additional property keys and/or property values. In this way, duplicate property keys, confusingly similar property keys (e.g., 'windows' property key and 'number of windows property key'), and so forth may be avoided.

Property keys may be stored along with a path of a given node for which a property key has been created/associated. As such, property keys may only be stored once in association with the node for which the property key was created/ associated, rather than storing the property key for every node that can receive a property value associated with the property key (i.e., all child nodes of the node for which the property key was created/associated). More specifically, when a user desires to add a property value to a given node, a look-up may be performed to determine whether the given node shares a path with a node for which the property key was created/associated. In other embodiments, a given property key may be stored once for each node that may receive a property value associated with the given property key.

In an example, assume that a particular property key was created for (and associated with) the floor node 340C (i.e., floor 3) of the hierarchical graph 310 of FIG. 3. In such an example, when a user attempts to input a property value for the particular property at the office node 306D (i.e. office 1), a look-up may be performed to determine that the property key is associated with the floor node 340C and that the office node 306D is indeed within the path (i.e., a child node, grandchild node, and so forth) of the floor node 340C. The user may then be allowed to input a property value associated with the particular property key at the office node 306D. As such, a look-up associated with the path of any given node may be performed in order to determine any available properties (i.e., available to accept a property value associated with a particular property key) for that given node. Accordingly, a user may be able to perform a query to identify each property key available to a given node (or to children and/or ancestors of the given node) and input an appropriate property value associated any identified property key associated with the given node (or to children and/or ancestors of the given node).

FIG. 9 illustrates a flowchart of a method 900 for generating property keys associated with nodes of a hierarchical graph that is configured to provide access to sensor data from devices within a physical space. The method 900 is described with frequent reference to the environments of FIG. 2 through FIG. 8. The method 900 includes, modifying a hierarchical graph that defines a topology of a physical space and comprises a plurality of nodes (Act 910). The plurality of nodes of the hierarchical graph may comprise a top node for the physical space and a plurality of other nodes coupled, through zero or more intermediate nodes, to the top node of the physical space. One or more of the plurality of nodes may comprise a device node that represents a device located within the physical space. Each device is configured to provide data or receive control signals. For example, the hierarchical graph may comprise the hierarchical graph 310 of FIG. 3, which hierarchical graph defines a topology of a physical space and includes a plurality of nodes.

Modifying the hierarchical graph may also include generating one or more properties keys associated with a first node of the plurality of nodes within the hierarchical graph (Act 920). For instance, a property key associated with a unit type of temperature (e.g., Fahrenheit, Celsius, and so forth) may be associated with device node 420B of the hierarchical graph 310. Modifying the hierarchical graph may also include receiving a request associated with determining each property key available to a second node of the plurality of nodes within the hierarchical graph (Act 930), wherein the second node is a child node of the first node. For instance, in the previous example, a request associated with determining each property key available to the sensor 422B may be received.

Modifying the hierarchical graph may also include, in response to the received request, identifying that each of the one or more generated property keys are available to the second node (Act 940). For example, the unit of temperature type property key associated with the device node 420B may also be determined as being associated with the sensor node 422B based at least partially on the sensor node 422B being a child node of the device node 420B. Modifying the hierarchical graph may also include receiving data indicative of generating a new property key associated with the second node (Act 950). In the continuing example, a new property key associated with a type of temperature (e.g., indoor temperature, outdoor temperature, and so forth) may be associated with the sensor node 422B. Modifying the hierarchical graph may further include, based receiving the data indicative of generating the new property key, generating the new property key and associating the new property key with the second node (Act 960), wherein the new property key is available to each child node of the second node. For instance, in the continuing example, the temperature type property key may be automatically associated with any child nodes of the sensor node 422B.

In this way, a hierarchical graph that corresponds to physical spaces and allows for intuitive organization, access, and control of devices within the physical spaces may also provide flexibility that allows for utilization of the hierarchical graph in essentially any environment. For instance, a hierarchical graph (or portion of a hierarchical graph) may be modified to include any number of property keys associated with any number of nodes within the graph. In particular, property keys may be generated for particular types of nodes (e.g., area nodes, device nodes, sensor nodes, and so forth) and may also be inheritable by child nodes of a node for which a given property key is generated. Additionally, while property keys are extensible, only individuals having certain roles, permissions, and so forth may be able to generate new property keys, thus avoiding any confusion related to confusingly similar property keys.

Although the subject matter has been described in language specific to structural features and/or methodological acts, it is to be understood that the subject matter defined in the appended claims is not necessarily limited to the described features or acts described above, or the order of the acts described above. Rather, the described features and acts are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A computer system comprising:
one or more processors; and
one or more computer-readable storage media having stored thereon computer-executable instructions that are executable by the one or more processors to cause the computer system to generate property keys associated with nodes of a hierarchical graph that is configured to provide access to sensor data from devices within a physical space, the computer-executable instructions including instructions that are executable to cause the computer system to at least:
access a hierarchical graph that defines a topology of a physical space and that comprises a plurality of nodes, the plurality of nodes of the hierarchical graph comprising a top node for the physical space and a plurality of other nodes coupled, through zero or more intermediate nodes, to the top node of the physical space, one or more of the plurality of nodes comprising a device node that each represents a device located within the physical space, each device being configured to provide data or receive control signals, one or more of the plurality of nodes comprising a user node that represents a user associated with an area or a device within the physical space;

generate a first property key associated with a first node of the plurality of nodes within the hierarchical graph, and store the first property key in a property store that is separate from the hierarchical graph, while associating the first property key with an identification of a first path of the first node within the hierarchical graph;

receive a request associated with determining each property key available to a second node of the plurality of nodes within the hierarchical graph, the second node being a child node of the first node;

in response to the received request,
 query the property store to determine that the first property key is associated with the identification of the first path of the first node; and
 based on the first property key being associated with the identification of the first path of first node, determine that the first property key is available to the second node by virtue of the second node being a child node of the first node;

based on the first property key being available to the second node, receive data indicative of associating the first property key with the second node; and based receiving the data indicative of associating the first property key with the second node, update the first property key in the property store to associate the first property key with an identification of the second path of the second node within the hierarchical graph, such that the first property key is associated with each of the first path of the first node within the hierarchical graph and the second path of the second node within the hierarchical graph.

2. The computer system of claim 1, wherein the request is received from a user having permissions associated with an administrator.

3. The computer system of claim 1, wherein determining that the first property key is available to the second node comprises determining that a property value associated with the first property key may be received as input.

4. The computer system of claim 1, wherein at least one set of property values associated with the first property key is strongly typed.

5. The computer system of claim 1, wherein the computer-executable instructions further include instructions that are executable to cause the computer system to receive a property value associated with both the second node and the first property key.

6. The computer system of claim 1, wherein the computer-executable instructions further include instructions that are executable to cause the computer system to store within each given node in the hierarchical graph, a full path of the given node within the hierarchical graph.

7. The computer system of claim 6, wherein the computer-executable instructions further include instructions that are executable to cause the computer system to use the stored full path of within a given node to perform a query that identifies at least one of (i) one or more parent nodes associated with the given node, or (ii) one or more child nodes associated with the given node.

8. The computer system of claim 7, wherein the query is an O(1) operation.

9. The computer system of claim 8, wherein the computer-executable instructions further include instructions that are executable to cause the computer system to, in response to receiving a request to determine availability of each property key associated with a particular node, utilize the stored full path of the particular node to determine each available property key associated with the particular node.

10. A method, implemented at a computer system that includes one or more processors, for generating property keys associated with nodes of a hierarchical graph that is configured to provide access to sensor data from devices within a physical space, comprising:

accessing a hierarchical graph that defines a topology of a physical space and that comprises a plurality of nodes, the plurality of nodes of the hierarchical graph comprising a top node for the physical space and a plurality of other nodes coupled, through zero or more intermediate nodes, to the top node of the physical space, one or more of the plurality of nodes comprising a device node that each represents a device located within the physical space, each device being configured to provide data or receive control signals;

generating a first property key associated with a first node of the plurality of nodes within the hierarchical graph, and storing the first property key in a property store that is separate from the hierarchical graph, while associating the first property key with an identification of a first path of the first node within the hierarchical graph;

receiving a request associated with determining each property key available to a second node of the plurality of nodes within the hierarchical graph, the second node being a child node of the first node;

in response to the received request,
 querying the property store to determine that the first property key is associated with the identification of the first path of the first node; and
 based on the first property key being associated with the identification of the first path of first node, determining that the first property key is available to the second node by virtue of the second node being a child node of the first node;

based on the first property key being available to the second node, receiving data indicative of associating the first property key with the second node; and based receiving the data indicative of associating the first property key with the second node, updating the first property key in the property store to associate the first property key with an identification of the second path of the second node within the hierarchical graph, such that the first property key is associated with each of the first path of the first node within the hierarchical graph and the second path of the second node within the hierarchical graph.

11. The method of claim 10, wherein the request is received from a user having permissions associated with an administrator.

12. The method of claim 10, wherein determining that the first property key is available to the second node further comprises determining that a property value associated with the first property key may be received as input.

13. The method of claim 10, wherein at least one set of property values associated with the first property key is strongly typed.

14. The method of claim 10, further comprising:
receiving a property value associated with both the second node the first property key.

15. The method of claim 10, further comprising:
storing within each given node in the hierarchical graph, a full path of the given node within the hierarchical graph.

16. The method of claim 15, further comprising:
using the stored full path of within a given node to perform a query that identifies at least one of (i) one or more parent nodes associated with the given node, or (ii) one or more child nodes associated with the given node.

17. The method of claim 16, wherein one or more of the plurality of nodes comprises a user node that represents a user associated with an area or a device within the physical space.

18. The method of claim 17, further comprising:
in response to receiving a request to determine availability of each property key associated with a particular node, utilizing the stored full path of the particular node to determine each available property key associated with the particular node.

19. A computer program product comprising one or more hardware storage devices having stored thereon computer-executable instructions that are executable by one or more processors of a computer system to cause the computer system to generate property keys associated with nodes of a hierarchical graph that is configured to provide access to sensor data from devices within a physical space, the computer-executable instructions including instructions that are executable to cause the computer system to at least:
access a hierarchical graph that defines a topology of a physical space and that comprises a plurality of nodes, the plurality of nodes of the hierarchical graph comprising a top node for the physical space and a plurality of other nodes coupled, through zero or more intermediate nodes, to the top node of the physical space, one or more of the plurality of nodes comprising a device node that each represents a device located within the physical space, each device being configured to provide data or receive control signals;
generate a first property key associated with a first node of the plurality of nodes within the hierarchical graph, and store the first property key in a property store that is separate from the hierarchical graph, while associating the first property key with an identification of a first path of the first node within the hierarchical graph;
receive a request associated with determining each property key available to a second node of the plurality of nodes within the hierarchical graph, the second node being a child node of the first node;
in response to the received request,
query the property store to determine that the first property key is associated with the identification of the first path of the first node; and
based on the first property key being associated with the identification of the first path of first node, determine that the first property key is available to the second node by virtue of the second node being a child node of the first node;
based on the first property key being available to the second node, receive data indicative of associating the first property key with the second node; and
based receiving the data indicative of associating the first property key with the second node, update the first property key in the property store to associate the first property key with an identification of the second path of the second node within the hierarchical graph, such that the first property key is associated with each of the first path of the first node within the hierarchical graph and the second path of the second node within the hierarchical graph.

20. The computer program product in accordance with claim 19, wherein the request is received from a user having permissions associated with an administrator.

* * * * *